United States Patent
Son et al.

(10) Patent No.: US 9,748,577 B2
(45) Date of Patent: Aug. 29, 2017

(54) DUAL COATING METHOD FOR ELECTRODE

(71) Applicant: LG Chem, Ltd., Seoul (KR)

(72) Inventors: Jin Young Son, Daejeon (KR); Hyun Won Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/955,267

(22) Filed: Dec. 1, 2015

(65) Prior Publication Data

US 2016/0218348 A1 Jul. 28, 2016

(30) Foreign Application Priority Data

Jan. 28, 2015 (KR) .................. 10-2015-0013508

(51) Int. Cl.
| | | |
|---|---|---|
| B05D 5/12 | (2006.01) | |
| H01M 4/62 | (2006.01) | |
| H01M 10/0587 | (2010.01) | |
| H01M 4/04 | (2006.01) | |
| H01M 4/131 | (2010.01) | |
| B05D 7/00 | (2006.01) | |
| B05D 1/36 | (2006.01) | |

(52) U.S. Cl.
CPC ......... *H01M 4/622* (2013.01); *H01M 4/0404* (2013.01); *H01M 4/131* (2013.01); *H01M 4/623* (2013.01); *H01M 10/0587* (2013.01); *B05D 1/36* (2013.01); *B05D 5/12* (2013.01); *B05D 7/50* (2013.01)

(58) Field of Classification Search
USPC .................. 427/58, 97.1, 115, 123
See application file for complete search history.

(56) References Cited

U.S. PATENT DOCUMENTS

| | | | | |
|---|---|---|---|---|
| 2008/0305394 A1* | 12/2008 | Hisamitsu | ............... | H01M 4/13 429/209 |
| 2011/0039140 A1* | 2/2011 | Miyahisa | ............ | H01M 2/1673 429/94 |
| 2011/0168550 A1* | 7/2011 | Wang | ...................... | H01M 4/13 204/290.12 |
| 2013/0022867 A1* | 1/2013 | Suzuki | .................... | H01M 4/13 429/211 |
| 2013/0170099 A1* | 7/2013 | Lee | ......................... | H01G 9/042 361/502 |
| 2013/0236790 A1* | 9/2013 | Byun | .................... | H01M 4/505 429/224 |
| 2013/0244082 A1* | 9/2013 | Lee | ..................... | H01M 2/1646 429/145 |

(Continued)

FOREIGN PATENT DOCUMENTS

| | | |
|---|---|---|
| JP | 5647447 B2 | 12/2014 |
| KR | 20060027255 A | 3/2006 |

(Continued)

*Primary Examiner* — Brian K Talbot
(74) *Attorney, Agent, or Firm* — Lerner, David, Littenberg, Krumholz & Mentlik, LLP

(57) ABSTRACT

Provided is a dual coating method for an electrode, which coats the electrode of a battery. The dual coating method for an electrode includes transferring the electrode, coating the transferred electrode with a first coating solution, and coating the primarily-coated electrode with a second coating solution different from the first coating solution.

12 Claims, 1 Drawing Sheet

(56) References Cited

U.S. PATENT DOCUMENTS

2014/0004399 A1* 1/2014 Kim .................. H01M 10/0587
429/94
2014/0023921 A1* 1/2014 Lee ........................ H01M 4/13
429/211

FOREIGN PATENT DOCUMENTS

KR 100646550 B1 11/2006
KR 20140070260 A 6/2014

* cited by examiner

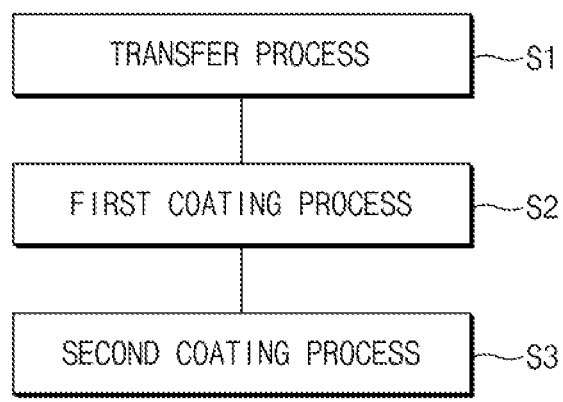

DUAL COATING METHOD FOR ELECTRODE

CROSS-REFERENCE TO RELATED APPLICATIONS

This application claims the priority of Korean Patent Application No. 10-2015-0013508 filed on Jan. 28, 2015, in the Korean Intellectual Property Office, the disclosure of which is incorporated herein by reference.

BACKGROUND OF THE INVENTION

Field of the Invention

The present invention relates to a dual coating method for an electrode, and more particularly, to a dual coating method for an electrode, which realizes coating of an electrode for a battery.

Description of the Related Art

Secondary batteries are rechargeable unlike primarily batteries, and also, the possibility of compact size and high capacity is high. Thus, recently, many studies on secondary batteries are being carried out. Such a secondary battery is manufactured in a shape in which one battery cell is packaged in a pack form or a pack shape in which several tens of battery cells are connected to each other. As a result, secondary batteries are being widely used for power sources for driving motors of vehicles.

Electrode slurry in which an active material and a conductive material are mixed is applied to metal foil and then dried at a high temperature to perform a pressing process, thereby manufacturing an electrode of a secondary battery. A slot die coater for producing an electrode is a device for applying electrode slurry to metal foil.

That is, the slot die coater denotes a device in which a liquid fluid (slurry, an adhesive, a hard coating agent, ceramic, etc.) having fluidity is supplied between upper and lower slot dies by using a pulse-free pump or piston pump to apply a fluid supplied from a liquid supply pipe to a uniform thickness in a width direction with respect to an advancing direction of an object to be coated such as fabrics, films, glass plates, and sheets. The slot die coater for producing the electrode may be a device for applying a slot die coater to produce an electrode, i.e., a device for applying electrode slurry that is a supply fluid to metal foil to produce the electrode for the secondary battery.

Since the electrode slurry varies in flow rate in a width direction thereof according to process conditions and the shape of the slot die, it is necessary to adequately design a shape of each portion of the slot die coater for producing the electrode so at to obtain a coating layer having a uniform thickness.

An active material and a conductive material may be mixed in the electrode slurry at a high mass fraction to reduce a time taken for the drying process and secure productivity of the electrode. Thus, the electrode slurry may have high viscosity. The electrode slurry may be stagnant or have a very low flow rate according to a shape of a flow path in all sections from a mixing tank for storing and supplying the electrode slurry to the slot die coater for producing the electrode.

An electrode plate of a secondary battery and a coating apparatus for the electrode plate of the secondary battery according to the related art are disclosed in Korean Patent Registration No. 10-0646550.

The secondary battery according to the related art may be generally manufactured through single-layer coating using a single kind of electrode slurry.

However, the above-described method may have limitations such as crack due to a high curvature at a winding core because a single layer is uniformly coated and then wound to assemble a cell such as a circular cell.

SUMMARY OF THE INVENTION

An aspect of the present invention provides a dual coating method for an electrode, which prevents cracks from occurring in a winding core of a circular battery during a winding process while minimizing degradation in characteristic of the battery.

According to an aspect of the present invention, there is provided a dual coating method for an electrode, the method including: transferring the electrode; coating the transferred electrode with a first coating solution; and coating the primarily-coated electrode with a second coating solution different from the first coating solution.

The coating of the primarily-coated electrode may include coating a portion of the electrode coated with the first coating solution.

The first coating solution may have a slurry form and superior adhesion characteristics with respect to a surface of the metal when compared to those of the second coating solution.

The first coating solution may have porosity less than that of the second coating solution.

The second coating solution may be composed of an active material having a mean particle size greater than that of the first coating solution.

The second coating solution may include a rubber-based binder.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a flowchart of a dual coating method for an electrode according to an embodiment of the present invention.

DETAILED DESCRIPTION OF THE PREFERRED EMBODIMENT

Exemplary embodiments of the present invention will now be described in detail with reference to the accompanying drawings. However, the present invention is not limited to the exemplary embodiments. Like reference numerals refer to like elements throughout.

FIG. 1 is a flowchart of a dual coating method for an electrode according to an embodiment of the present invention.

As shown in FIG. 1, the dual coating method for an electrode according to an embodiment of the present invention includes a transfer process (S1) of transferring an electrode, a first coating process (S2) of coating the transferred electrode with a first coating solution, and a second coating process (S3) of coating the primarily-coated electrode with a second coating solution that is prepared from a material different from the first coating solution.

In general, the transfer process (S1) may be performed by using a conveyer or transfer belt which is used for transferring the electrode while the electrode of the secondarily battery is manufactured.

The first coating process (S2) may be a process of coating the electrode transferred in the transfer process (S1) with the first coating solution. A material having superior adhesion characteristics with respect to a surface of a metal such as the electrode that is provided in the form of slurry may be used as the first coating solution.

That is, the first coating solution may be prepared from a material that is capable of improving adhesion force with a surface of the electrode formed of a metal material. In the current embodiment, an active material such as lithium cobalt oxide (LCO) and nickel manganese cobalt oxide (NMC) is used as the first coating solution, but is not limited thereto.

Also, a polyvinylidene difluoride (PVDF) binder having low electric resistance may be mixed in a binder that is used as the first coating solution so that the binder is physically attached to the surface of the metal such as the electrode.

The second coating process (S3) may be a process of coating a portion of the electrode, which is coated with the first coating solution in the first coating process (S2), with a second coating solution different from the first coating solution.

Here, the second coating solution is applied to only a portion of the electrode except for an area defining a curved surface such as a winding core. Thus, the area defining the curved surface may be coated with only the first coating solution.

That is, the coating may be performed only once on the area defining the curved surface such as the winding core to minimize a thickness of the coated slurry, thereby previously preventing cracks from occurring in the curved surface that is formed when wound.

This is done because tensile force applied to a surface of the coating layer increases to increase possibility of occurrence of the cracks when the coating layer increases in thickness on the curved area.

Also, since adhesion force with respect to the first coating solution is required for the second coating solution, an active material having a specific surface area greater than that of the first coating solution may be used as the second coating solution. Thus, the first coating solution having a relatively small specific surface area may be filled into the second coating solution to increase a contact area of the active material, thereby improving the adhesion force.

Although lithium iron phosphate (LFP) or lithium titanate (LTO) that is an active material having a relatively large specific surface area when compared to that of the first coating solution is used as the second coating solution in the current embodiment, the present invention is not limited thereto. For example, the material of the second coating solution may be determined in consideration of the specific surface area of the first coating solution.

Also, BN-730H manufactured by Zeon Ltd., in which rubber-based butadiene is added to increase liquidity may be used as a binder of the second coating solution.

The above-described first and second coating solutions may change in composition by using active materials different from each other or binders different from each other.

Also, the second coating solution is composed of an active material having a mean particle size greater than that of the first coating solution to provide porosity greater than that of the first costing solution. Thus, a phenomenon in which higher compressive force is transmitted to the electrode by compression occurring when a rolling process is performed on the electrode may be offset to prevent the performance of the battery from being deteriorated.

In the above-described dual coating method for the electrode according to the present invention, only the primary coater may be used for the coating of the winding core so that the electrode slurry is applied to a relatively low thickness when compared to those of other portions. In case of the portion having low possibility in occurrence of the cracks, the secondarily coater may be used to increase the coating amount of electrode slurry. Thus, when the battery is manufactured, all of the stability and performance of the battery may be satisfied. In addition, the primarily slurry having the good adhesion characteristics with respect to the surface of the metal that is a collector may be primarily applied, and then, the secondarily slurry having the good adhesion characteristics with respect to the slurry may be applied to the primarily slurry to efficiently utilize the characteristics of the battery.

According to the present invention, only the primary coater may be used for the coating of the winding core so that the electrode slurry is applied to a relatively low thickness when compared to those of other portions. In case of the portion having low possibility in occurrence of the cracks, the secondarily coater may be used to increase the coating amount of electrode slurry. Thus, when the battery is manufactured, all of the stability and performance of the battery may be satisfied.

According to the present invention, the primarily slurry having the good adhesion characteristics with respect to the surface of the metal that is the collector may be primarily applied, and then, the secondarily slurry having the good adhesion characteristics with respect to the slurry may be applied to the primarily slurry to efficiently utilize the characteristics of the battery.

While the dual coating method for the electrode has been described with reference to the exemplary drawings, it will be apparent to those skilled in the art that modifications and variations can be made without departing from the spirit and scope of the invention as defined by the appended claims.

What is claimed is:

1. A dual coating method for an electrode, the method comprising:
    transferring the electrode, wherein the electrode has a surface which is formed of a metal material;
    coating the transferred electrode with a first coating solution to form a primarily-coated electrode; and then
    coating only a portion of the primarily-coated electrode with a second coating solution different from the first coating solution
    except for an area defining a curved surface,
    wherein the area defining the curved surface is coated with only the first coating solution to prevent cracking.

2. The dual coating method of claim 1, wherein the first coating solution has a slurry form and superior adhesion characteristics with respect to the metal material of the surface of the electrode when compared to those of the second coating solution.

3. The dual coating method of claim 1, wherein the first coating solution has porosity less than that of the second coating solution.

4. The dual coating method of claim 1, wherein the second coating solution is composed of an active material having a mean particle size greater than that of the first coating solution.

5. The dual coating method of claim 1, wherein the second coating solution comprises a rubber-based binder.

6. A dual coating method for an electrode, the method comprising:
  coating an electrode with a first coating solution to form a primarily-coated electrode with a first coated-region, wherein the electrode has a surface which is formed of a metal material; and
  coating only a portion of the first coated-region of the primarily-coated electrode with a second coating solution different from the first coating solution except for an area defining a curved surface,
  wherein the area defining the curved surface is coated with only the first coating solution.

7. The dual coating method of claim 6, wherein the first coating solution has a slurry form and superior adhesion characteristics with respect to the metal material of the surface of the electrode when compared to those of the second coating solution.

8. The dual coating method of claim 6, wherein the first coating solution has porosity less than that of the second coating solution.

9. The dual coating method of claim 6, wherein the second coating solution comprises an active material having a mean particle size greater than that of the first coating solution.

10. The dual coating method of claim 6, wherein the second coating solution comprises a rubber-based binder.

11. The dual coating method of claim 1, wherein the area defining the curved surface is a winding core.

12. The dual coating method of claim 6, wherein the area defining the curved surface is a winding core.

* * * * *